United States Patent [19]
Rainville

[11] 4,180,379
[45] Dec. 25, 1979

[54] BLOW MOLDING MACHINE WITH ROTATING CORE RODS

[75] Inventor: Dewey Rainville, Westfield, N.J.

[73] Assignee: Rainville Company Inc., Middlesex, N.J.

[21] Appl. No.: 886,798

[22] Filed: Mar. 15, 1978

[51] Int. Cl.² .............................................. B29C 17/07
[52] U.S. Cl. ................................... 425/526; 264/538; 425/533
[58] Field of Search ................. 264/97; 425/526, 533; 264/538

[56] References Cited
U.S. PATENT DOCUMENTS

| | | | |
|---|---|---|---|
| 3,940,223 | 2/1976 | Farrell | 425/533 |
| 4,018,860 | 4/1977 | Farrell | 264/97 X |
| 4,046,498 | 9/1977 | Appel et al. | 425/526 |

FOREIGN PATENT DOCUMENTS 2339018  2/1975  Fed. Rep. of Germany ........... 425/533

Primary Examiner—Jan H. Silbaugh
Attorney, Agent, or Firm—Roy C. Hopgood; John M. Calimafde; Charles W. Neill

[57] ABSTRACT

This blow molding machine overcomes the tendency of the parison to sag toward the bottom side of the core or for air currents to unevenly cool the parison, while at the same time allowing the parison to be cooled from the core side and then outside to the desirable orienting temperature, so that at the subsequent blow, or stretch-blow station, a bi-axially oriented container is produced having uniform wall distribution. As a means of intensifying the cooling on the outside, in order to speed up the operation, provisions are made to enclose the parison with an open end cylinder having means of introducing a flow of air in a tangential manner so that it circulates around the parison as the parison is rotated.

11 Claims, 5 Drawing Figures

BLOW MOLDING MACHINE WITH ROTATING CORE RODS

BACKGROUND AND SUMMARY OF THE INVENTION

Stronger articles can be made by blow molding if the plastic material is bi-axially oriented. This requires stretching the material in different directions while the material is at its "orientation temperature" which is the temperature at which crystallization begins.

In order to obtain some cooling of the parison in the injection mold, the temperature of the molten plastic is reduced by leaving the parisons in the injection mold while they are cooled by inside cooling through the core rods and outside cooling by contact with cooled walls of the injection mold cavities.

Further control of the temperature is obtained by indexing the core rods to a temperature control station at which the core rods are located in chambers through which air circulates. In the preferred construction, the air circulation chambers are cylindrical with clearance around all sides of the core rods, and air is introduced at a center region and discharges from both ends of the chambers. In order to prevent flow by gravity of the parison material toward the bottom sides of the core rods while the material is soft, the core rods are rotated while in the temperature-controlling chambers; and this rotation also equalizes the cooling effect of the air which is introduced into the cooling chambers.

From a temperature control station, the parisons may be indexed to a pre-blow station where the parison is stretched circumferentially and axially by a initial blowing operation; or the parison can be transferred directly to the final blow station where it is blown to the final dimensions of the article being made on the machine. From the blow mold, the blown articles are transferred to a stripper station at which they are removed from the core rods and the core rods are indexed to the injection station to receive a new set of parisons. The blowing, stripping and indexing back to the injection station are conventional and well-understood in the blowing machine art.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
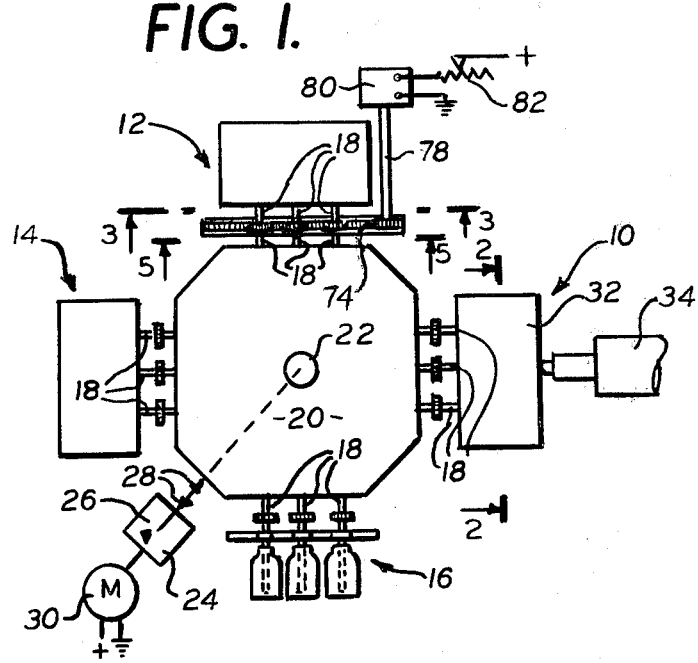
FIG. 1 is a diagrammatic top plan view showing a molding machine made in accordance with this invention.

FIG. 1 is a diagrammatic plan view of a blow molding machine having an injection station 10; a parison treating station 12; a blowing station 14; and a stripper station 16. Core rods 18 extend from side faces of indexing head 20 which moves intermittently through 90° angular movements about a shaft 22; and which raises and lowers in order to lift the core rods 18 clear of the lower sections of molds at the various stations.

Mechanism for raising and lowering the shaft 22 and for rotating it intermittently about its axis is indicated diagrammatically by the gear box 24; the rotary movement being indicated by the arrow 26 and the vertical movement being indicated by the arrows 28. Power to the gear box is supplied by an electric motor 30. All of the structure except the treating station 12 is conventional and no further description of it is necessary for a complete understanding of this invention.

Figure 2:
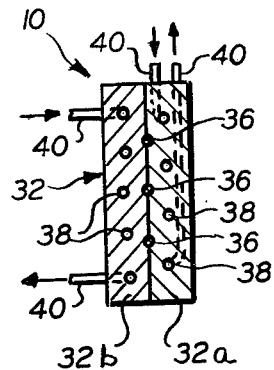
FIG. 2 is a diagrammatic sectional view taken on the line 2—2 of FIG. 1.

FIG. 2 is a sectional view taken through a mold 32 at the injection station 10. Plastic in a molten state is discharged from a plasticizer 34 into a manifold in the mold 32 where it is distributed to mold cavities, indicated by the reference characters 36.

The core rods 18 (FIG. 1) extend into the cavities of the injection mold 32 and are coated with molten plastic to form parisons along the lengths of the core rods 18 which extend into the cavities. The mold 32 has a lower fixed section 32a which is attached to the frame of the blow molding machine. An upper mold section 32b is movable toward and from the fixed section 32a in order to open the mold when the core rods are to be lifted clear of the fixed section 32a and rotated angularly to the next station of the blow molding machine. There are cooling chambers 38 in the upper and lower sections of the mold 32, and these cooling chambers 38 have hoses 40 for the entrance and discharge of water or other cooling fluid into and out of the mold sections 32a and 32b. This structure shown in FIG. 2 is also conventional and is used in the same way as in other blow molding machines, except that the parisons may remain in the mold 32 somewhat longer than is conventional, and the cooling fluid circulated through the chambers 38 and hoses 40 may be at somewhat lower temperature in order to have the plastic, of which the parison is composed, come from the mold at somewhat lower temperature than is ordinarily used.

Since the temperature of the parison depends, to some extent, upon the material used for the blow molding operation, and since orientation temperatures of different materials are not the same, the use of the mold 32 for reducing the parison temperature more than usual may not be necessary, as will be explained more fully in connection with the description of the parison treating station 12.

Figure 3:
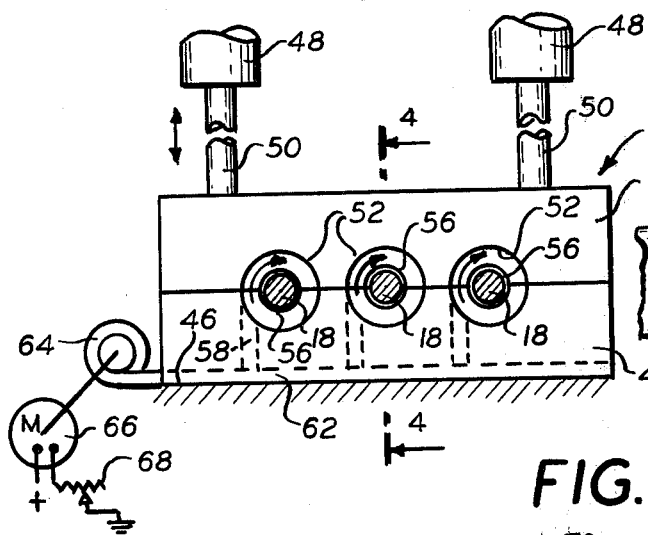
FIG. 3 is an enlarged front view taken on the line 3—3 of FIG. 1.
Figure 4:
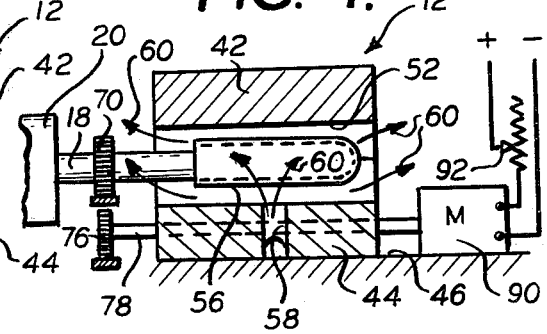
FIG. 4 is a sectional view taken on the line 4—4 of FIG. 3.

FIG. 3 shows the treating station 12 which includes a housing having an upper section 42 and a lower section 44. The lower section 44 is secured to a stationary frame 46 of the blow molding machine by fastening means (not shown). The upper section 42 is movable toward and from the lower section 44 in the same manner as the molds open and close. In FIG. 3, hydraulic motors 48 having pistons 50 secured to the upper section 42 are representative of power means for opening and closing the housing at the parison treating station 12. This housing differs from a mold only in that the housing has chambers 52 which are open at both ends, whereas mold cavities are closed except for the cylindrical passage through which the core rod extends. A section through the middle chamber 52 is shown in FIG. 4. the chamber 52 is preferably cylindrical, and the core rod 18 extends into the chamber 52 and it is substantially coaxial thereto. The parison, indicated by the reference character 56 is of substantially smaller diameter than the chamber 52, so that air introduced into the chamber 52 through a passage 58 circulates over the surface of the parison 56, as indicated by the arrows 60, and discharges from both ends of the chamber 52, so as to cool the parison 56 as evenly as possible.

FIG. 3 shows all of the chambers 52 supplied with air through passages 58 extending upward from a manifold 62, which is supplied with air through a centrifugal blower 64 driven by a motor 66 with a speed control 68 for driving the blower 64 faster or slower as necessary to obtain the desired amount of cooling. This treating station 12 is representative of means for bringing the parison 56 to an orientation temperature so that when the indexing head 20 makes its next angular movement, and carries the parison 56 from the treating station 12 to the blow station 14 (FIG. 1), the stretching of the parison at the blow station 14, with the plastic of the parison at orientation temperature, produces a container with biaxial orientation which makes the container much stronger than if blown at other temperatures.

Since the objective of all blow molding machines is to obtain finished products in the largest quantities for the time of operation, the length of time that the core rods remain at any of the operational stations is reduced as much as possible. With the present invention, the parisons are formed in the injection station 10 by coating the core rods 18 which are in the cavities of the injection mold. Upon completion of the injection operation, the mold 32 opens and the indexing head 20 moves upward to clear the bottom section of the mold 32 and shift the core rods 18, with the parisons on them, to the treating station 12. All of the necessary cooling of the parisons could be done in the injection mold, but if this required that the injection cycle be twice as long, it is evident that the production of the machine would be cut in half. The treating station 12 increases the production of the machine by making it possible to have the injection cycle short; but one of the problems of the prior art has been that when the parisons are removed from the injection mold at a very high temperature, the material of the plastic is softer and the plastic tends to move downward by gravity around the sides of the core rod so that it becomes thicker on the underside than on the upperside. Such a distribution of the material of the parison makes it impossible to blow a satisfactory container.

This invention permits the core rods, with the parison still soft, to be removed from the injection mold 32 and brought to the treating station 12 where the core rods 18 are rotated during treating to eliminate any sagging of the parison material to the underside of the core rod.

Figure 5:
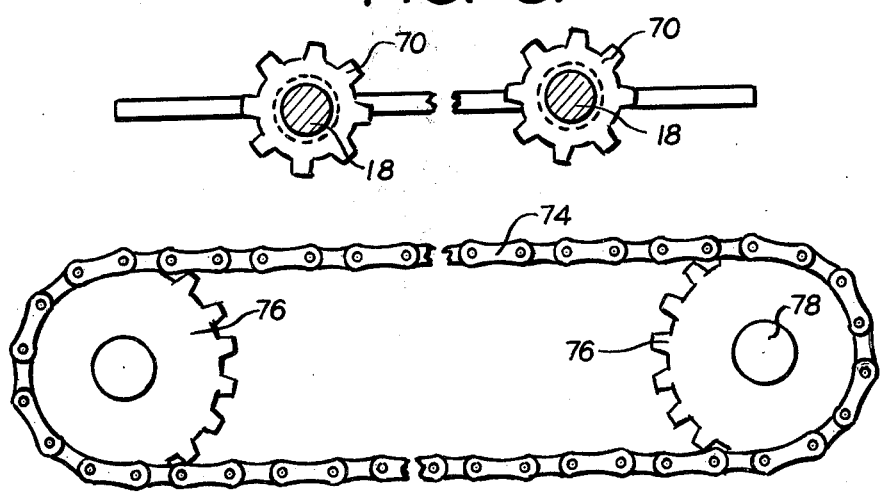
FIG. 5 is a diagrammatic view showing the sprockets on the core rods and the chain which the sprockets on the core rods engage when the core rods move downward to the level of the treating station, this engagement allowing movement of the chain to cause the sprockets on the cores and as well as the parisons, to rotate, the view being an enlarged sectional view on line 5—5 of FIG. 1.

FIG. 5 shows each of the core rods 18 with a sprocket wheel 70 secured to the core rod at a location between the indexing head 20 and any of the other structure at the operational stations 10, 12, 14 and 16. When the core rods 18 move into position between the open sections of the housing at the station 12, and the indexing head 20 then lowers to position the core rods 18 and parisons 56 on the center line of the chambers 52, the sprockets 70 engage a chain 74 which is located immediately below the sprockets 70. This sprocket chain 74 is an endless chain which runs around driving sprockets 76 at locations beyond the core rods. One of the sprockets 76 has a drive shaft 78 rotated by a motor 80 at a speed regulated by a speed controller 82 when the motor is turned on during the treating cycle.

Thus during the entire time that the parisons 56 are in the chambers 52 of the treating station, the parisons are rotated so that any sagging of the plastic of the parisons is compensated by the sagging plastic being carried around to the upper side of the core rod. The chain 74 is driven at the speed necessary to eliminate sagging, and this speed depends upon the kind of material used for the parison but can be easily adjusted by watching the parisons as the machine operates and by determining the uniformity of the side walls of the containers that are blown at the blow station 14.

The parisons at the treating station 12 are cooled to a temperature which will result in the parisons being at orientation temperature at the time that the blowing operation is begun at the blow station 14. Some little additional heat is lost as the core rods and their parisons move from the treating station 12 to the blow station 14. The cooling time at the treating station 12 should be synchronized with the injection cycle in the mold 32, and the amount of cooling in the chambers 52 (FIG. 4) can be regulated to some extent by the temperature of the air supplied to the blower 64 and by the quantity of air passing through the chambers 52 which is in turn regulated by increasing or decreasing the speed of the motor 66. However, the velocity of air through the chambers 52 must be kept at a moderate value so that it does not move the molten material of the parison 56 axially along the parison away from the midpoint of the parison where the air conduit 58 introduces the air into the chamber 52.

The rate at which the sprocket wheels 70 rotate the core rods 18 is regulated by a motor and gear train 90 which has a speed controller 92 for increasing or decreasing the speed of the driving sprocket 76 at the end of the drive shaft 78.

Core rods with internal cooling are well known and such core rods can be used with the present invention in combination with the treating station 12 so that the parison can be cooled more uniformly, to orientation temperature, by withdrawing heat from both the outside and inside surfaces of the parison simultaneously.

The preferred embodiment of the invention has been illustrated and described, but changes and modifications can be made and some features can be used in different combinations without departing from the invention as defined in the claims.

What is claimed is:

1. Blow molding apparatus including an injection station, a blow station, and a stripping station angularly spaced around a substantially vertical axis, a core rod support that rotates about said axis, core rods carried by the support and extending generally horizontally from the support into molds at the respective stations, and means for moving the core rods intermittently and successively from one station to the next, characterized by a treatment station located between the injection station and the blow station, said treatment station including a housing with a chamber open at both ends and into which a core rod and its parison extend, the chamber being longer than the parison and extending axially of the parison between said open ends, means for controlling the temperature of the parison on the core rod at said treatment station to obtain a parison temperature that is in the orientation range, or just above it, for the particular material of which the parison is made, said means for controlling the temperature including a passage communicating with said chamber intermediate the ends thereof and including also means for blowing heat controlling fluid through the chamber via the passage and open ends, the core rod being rotatable about its axis, and means for rotating the core rod while at the treatment station to reduce sagging of the material of the parison to the underside of the core rod.

2. The blow molding apparatus described in claim 1 characterized by a plurality of core rods extending side-by-side from different parts of the core rod support, and separate heat-control chambers into which the individual side-by-side core rods extend when at the treating station.

3. The blow molding apparatus described in claim 1 characterized by means for blowing heat-controlling gas into each chamber, including a gas passage opening into the chamber through a side thereof at a region intermediate the open ends of the chamber and for discharge from both ends thereof, each chamber being longer than the parison on its core rod, and each parison terminating back from the ends of the chambers when positioned in a chamber for controlling the temperature of the parison.

4. Blow molding apparatus as described in claim 3 characterized by the chambers being of substantially larger cross-section than the parisons, and the core rods being substantially coaxial with the chamber for circulation of air around the full circumference of the parison at moderate velocity of the air.

5. Blow molding apparatus as described in claim 1 characterized by each of the core rods having a motion-transmitting element on it at a location axially spaced from the parison of the core rod, and driving mechanism with which each of the motion-transmitting elements make contact when the parisons on the core rods are in said heat-control chambers.

6. Blow molding apparatus as described in claim 5 characterized by each of the motion-transmitting elements being a wheel secured to and coaxial with its core rod and in a line corresponding with the line of core rods, each wheel having teeth projecting from its periphery, the driving mechanism having depressions for receiving the teeth of the motion-transmitting elements on the core rods, and a motor for operating the driving mechanism.

7. Blow molding apparatus as described in claim 6 characterized by the wheels being sprocket wheels, and the driving mechanism being a sprocket chain with a run in position to engage the sprockets on the core rods when the core rods are in working relation with the heat-control chambers, and sprockets supporting the chain beyond the core rod sprockets at both ends of the row of sprocket wheels on the core rods, the sprockets on the core rods rising clear of the chain when the core rod support rises to move the core rods from one station to another.

8. The blow molding apparatus described in claim 1 characterized by molds at the respective stations having upper sections that rise from stationary lower sections to provide clearance for a core rod to rise clear of a cavity in the lower section of the molds and for angular movement to the next station, the core rod support being an indexing head that rises to lift the core rods clear of the lower mold sections and that then moves angularly to carry a core rod at one station to the next station, the heat-treating station having sections similar to the mold sections that open and close to provide clearance for the angular movement of the core rods, the chamber at the treatment station being open at both ends at all times.

9. The blow molding apparatus described in claim 1 characterized by a plurality of core rods extending side-by-side from different parts of the core rod support, and separate heat control chambers into which the individual side-by-side core rods extend when at the treating station, each chamber being open at both ends, and means for blowing heat-controlling air into each chamber at a region intermediate the ends of the chamber and for discharging from both ends thereof, each chamber being larger than the parison on its core rod and each parison terminating back from the ends of the chamber, means for cooling the parisons while in the injection mold, and other means for controlling the temperature of the parison at the treatment station including apparatus for supplying temperature-controlling fluid to the chambers of the treatment station, and means for regulating the rate of temperature change.

10. The blow molding apparatus described in claim 9 characterized by the means for supplying temperature-controlling fluid to the chambers being a fan, and the means for regulating the rate of heat change being a motor that drives the fan and a speed control on the motor.

11. The blow molding apparatus described in claim 10 characterized by the core rods being internally cooled to withdraw heat from the inside surfaces of the parisons at the treatment station while the outside surfaces of the parisons are cooled by air in the chambers of the treatment station, and means for supplying steady flow of air through the chambers.

* * * * *